United States Patent [19]
Conway

[11] 3,944,889
[45] Mar. 16, 1976

[54] SHORT-CIRCUIT PROTECTION CIRCUIT
[75] Inventor: David Conway, Exeter, England
[73] Assignee: AMP Incorporated, Harrisburg, Pa.
[22] Filed: Dec. 6, 1974
[21] Appl. No.: 530,266

[30] Foreign Application Priority Data
Dec. 22, 1973  United Kingdom............... 59711/73

[52] U.S. Cl.............. 317/31; 307/235 R; 317/33 R; 317/36 TD; 340/248 B
[51] Int. Cl.².......................................... H02H 3/24
[58] Field of Search......... 307/235 R; 317/18 R, 31, 317/33 R, 33 VR, 36 TD, 49; 340/248 B

[56] References Cited
UNITED STATES PATENTS

| | | |
|---|---|---|
| 3,229,164 | 1/1966 | McCartney et al. ........... 317/33 VR |
| 3,512,044 | 5/1970 | Jones............................. 317/33 VR |
| 3,670,246 | 6/1972 | Gately........................... 340/248 B |
| 3,906,258 | 9/1975 | Moe................................ 317/33 R |

*Primary Examiner*—James D. Trammell
*Attorney, Agent, or Firm*—William J. Keating; Jay L. Seitchik; Frederick W. Raring

[57] ABSTRACT

A short-circuit protection circuit for use in an arrangement in which a load is connected to a source of electrical power by way of switch, operates to open the switch only when a true short circuit condition exists, the circuit discrminating between a true short circuit condition and short duration high current surges caused, for example, by bouncing of the contacts of the switch or transient characteristics of the load.

12 Claims, 1 Drawing Figure

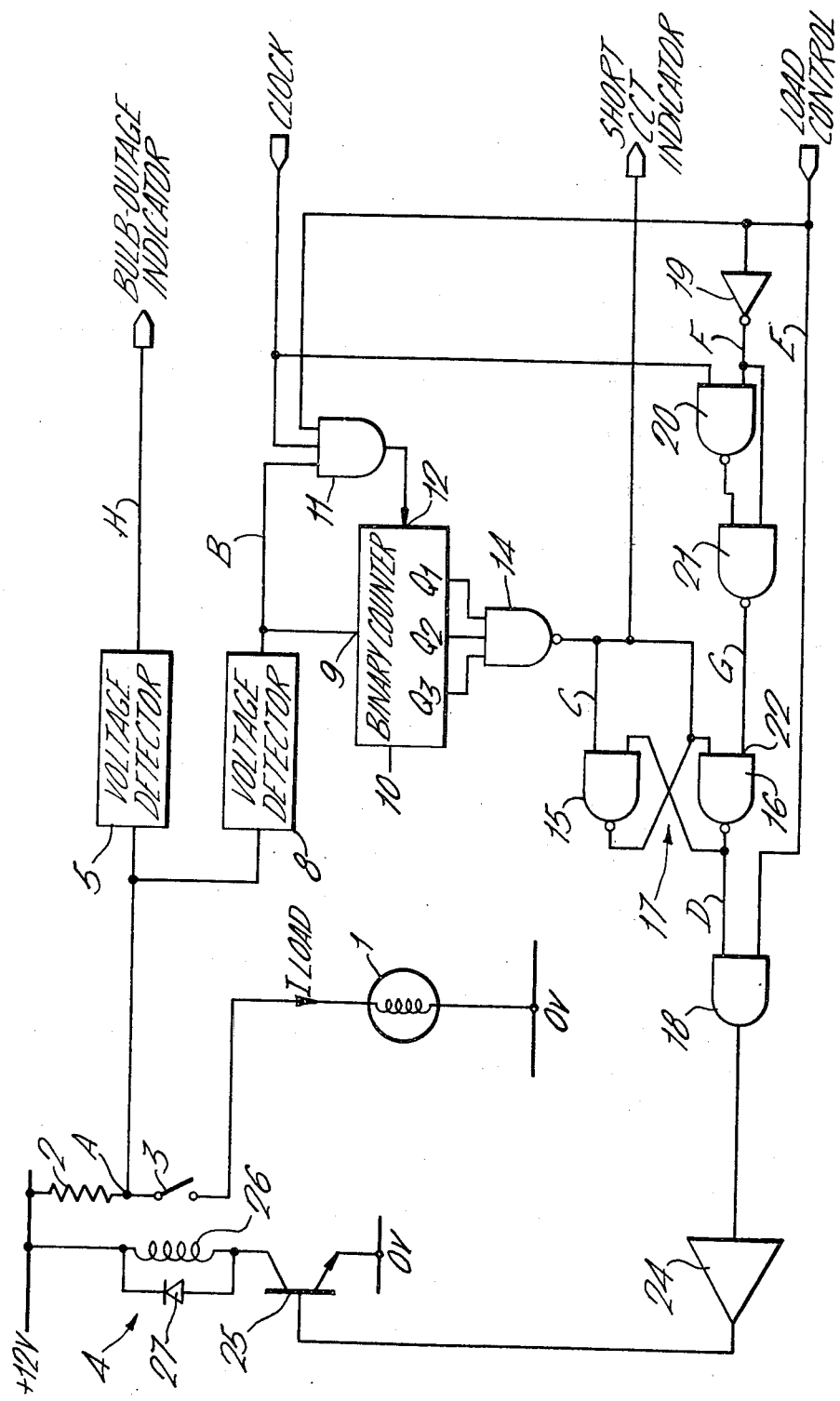

SHORT-CIRCUIT PROTECTION CIRCUIT

This invention relates to a short-circuit protection circuit.

In many electric circuit arrangements in which a load is connected to a source of electrical power by way of a switch it is essential that in the event of a short circuit occurring, which would result in an exceptionally high current being passed through the load causing damage thereto, the switch being opened in order to isolate the load from the source of electrical power.

However, it is clearly desirable that the switch be opened only when a true short circuit exists; that is the switch should be under the control of means capable of discriminating between a true short circuit condition and short duration high current surges supplied to the load and caused, for example, by switch contact bounce on operation of the switch, and resulting from the nature of the load, for example transient characteristics when the load is a tungsten filament lamp.

The present invention is a short-circuit protection circuit for detecting a high short circuit direct current flowing through an electric switch to a load and opening the switch, characterised by a voltage detector connectible to the live side of the load and providing a first predetermined output logic signal when the detected voltage is in the vicinity of zero, the output of the voltage being connected to the input of a timing means adapted to provide a second predetermined output logic signal after the first predetermined output logic signal has persisted for a predetermined time, the output of the timing means being connected indirectly to the switch such that the existence of the second predetermined output logic signal opens the switch.

Preferably the output of the timing means is connected to a switch by way of a logic latch adapted to convert the second predetermined output logic signal into a steady state logic signal into a steady state logic signal.

The output of the logic latch is preferably connected to a first input of a logic gate a second input of which is connected to a load control line, and the output of which provides a third predetermined logic signal only when the second logic signal is present and a logic signal indicative of a load command is present on the load control line.

The load control line may be connected through logic gating to an input of the logic latch whereby the logic latch is reset when the load command signal is removed from the load control line.

Additionally, the circuit can include a second voltage detector connected in parallel with the first mentioned voltage detector and providing an output signal when the detected voltage rises above a predetermined value to indicate an open circuit.

An embodiment of the present invention will now be described, by way of example, with reference to the drawing which is a schematic diagram of a circuit according to the invention.

A load, which in this embodiment is a light bulb 1, is connected in series with a resistor 2 and the intervening normally open switch contacts 3 of a relay 4. As shown, this series circuit is connected between 12 volts at the resistor 2 and earth at the bulb 1. The value of the resistor 2 is so chosen that when normal load current flows through it the voltage developed across the resistor 2 is large enough to be detected in a voltage detector 5 which is connected to a point A between the resistor 2 and the contacts 3, but does not significantly reduce the voltage applied to the light bulb 1. Typically, the value of the resistor 2 is chosen to provide a voltage drop of 0.1 volt across the resistor 2.

As second voltage detector 8 is also connected to the point A. The output line B of the voltage detector 8 is connected to the clear input 9 of a binary counter 10 and also to one input of an AND-gate 11. The AND-gate 11 has two other inputs one of which is connected to a source of clock pulses, not shown, and the other of which is connected to a load control line E. The output of the AND-gate 11 is connected to the clock input 12 of the counter 10.

The counter 10 has three outputs $Q_1$, $Q_2$ and $Q_3$ which are connected as inputs to a NAND-gate 14 the output line C of which is connected as one input of a NAND-gate 15 which together with a further NAND-gate 16 comprises a NAND-latch 17. The latch effect is obtained by connecting the output of the gate 15 to an input of the gate 16, and connecting the output of the gate 16 as an input of the gate 15. The output line D of the NAND-gate 16 forms the latch output, and this is connected to an input of an AND-gate 18 the other input of which is connected to the load control line E. A short circuit indicator line is connected to the output of the NAND-gate 15.

The load control line E is also connected through an inverter 19 and a line F to an input of a NAND-gate 20 and an input of a NAND-gate 21. The NAND-gate 20 has a second input which is connected to the clock line, and the output of gate 20 is connected to a second input of gate 21. The output line G of gage 21 is connected to an input 22 of the latching NAND-gate 16.

The output of the AND-gate 18 is connected through a transistor drive interface 24 to the base of a switching transistor 25, the emitter of which is connected to earth and the collector of which is connected to one end of the coil 26 of the relay 4. The other end of the coil 26 is connected to the 12 volt supply line. A diode 27 is connected in parallel across the relay coil 26.

To energize the bulb 1, a logic '1' is applied to the load control line E by means not shown. This logic 1 which is applied to the AND-gate 18 in conjunction with a logic 1 derived at the output of the NAND-latch 17 provides a logic 1 at the output of gate 18 to render the transistor 25 conductive causing the coil 26 to be energized at the contacts 3 to close. This connects the light bulb 1 to the 12 volt supply line.

Suppose now the bulb 1 fails or becomes opencircuited for some other reason. Current ceases to flow through the resistor 2 and so the voltage at the point A will rise from 11.9 volts (12−0.1) to 12 volts. This change in voltage is detected by the voltage detector 5 which provides a logic 1 on its output line H thus providing a signal to indicate the open circuit.

Suppose that instead of an open circuit a short-circuit to earth in the bulb circuit occurs, the voltage at the point A will fall from 11.9 volts to 0 volts. This change in voltage is detected in the voltage detector 8 which provides a logic 1 at its output. This logic 1 releases the counter 10 from its previous (inhibit/reset) condition, and allows the AND-gate 11 which is energized on all three inputs to supply clock pulses to the counter 10. If the short-circuit persists the counter 10 will count from its reset condition of $Q_1=0$, $Q_2=0$, $Q_3=0$ until, after seven clock pulses, the complement code $Q_1=1$, $Q_2=1$, $Q_3=1$ is reached, at which point the NAND-gate 14 will decode the count and change its output from logic 1 to logic 0 thus setting the NAND-latch 17. The output of the latch 17 on line D will change from a logic 1 to a logic 0 thus inhibiting the relay control AND-gate 18, rendering the transistor 25 non-conductive and de-energizing the relay coil 26 to open the relay contacts 3. Thus, the dangerous high short-circuit current is stopped by isolating the 12 volt supply line from the bulb circuit. While the short-circuit persists the short-circuit indicator line is energized. This can be used to drive an indicator lamp.

The latch 17 remains set, thus holding the relay 4 off, until the load control signal is switched off, i.e., when the signal on the line E is changed from logic 1 to logic 0. This logic 0 is inverted by inverter 19 and allows the NAND-gates 20 and 21 to pass continuous resetting clock pulses to the input 22 of the NAND-latch 17.

In the case of a current surge when the relay contacts 3 close, the point A will momentarily dip towards 0 volts providing an apparent short-circuit condition which will be detected by the voltage detector 8. The output of the detector 8 on line B will initiate the counter cycle as described above. However, since the detected signal at A is a pulse (or pulses) of short total duration the counter cycle will have reached only the second or third count by the time the voltage at point A has fully returned to its original condition of 11.9 volts at which time the output of the detector 8 will return to logic 0 to reset the counter 10 and inhibit the AND-gate 11. Thus, the circuit successfully differentiates between a true steady state short-circuit condition and a transient, e.g. contact bounce, condition.

As a modification of the above described circuit the binary counter can be replaced by a triggered monostable device which on occurrance of an output from the detector 8, is switched to its unstable state. If the output from detector 8 persists for a predetermined time, at the end of this time the monostable device produces a short output pulse which switches over the latch 17. If however the output of the detector 8 does not persist for the predetermined time the monostable device reverts to its original stable state, does not produce an output pulse, and the latch 17 is not switched over.

What is claimed is:

1. A short-circuit protection circuit for detecting a high short circuit direct current flowing through an electric switch to a load and opening the switch, comprising a voltage detector connectible to the live side of the load and providing a first predetermined output logic signal when the detected voltage is in the vicinity of zero, the output of the voltage detector being connected to the input of a timing means adapted to provide a second predetermined output logic signal after the first predetermined output logic signal has persisted for a predetermined time, the output of the timing means being connected indirectly to the switch such that the existence of the second predetermined output logic signal opens the switch.

2. A circuit as claimed in claim 1, in which the output of the timing means is connected to the switch by way of a logic latch adapted to convert the second predetermined output logic signal into a steady state logic signal.

3. A circuit as claimed in claim 2, in which the output of the logic latch is connected to a first input of a logic gate a second input of which is connected to a load control line, and the output of which provides a third predetermined logic signal only when the second logic signal is present and a logic signal indicative of a load command is present on the load control line.

4. A circuit as claimed in claim 3, in which the load control line is connected through logic gating to an input of the logic latch whereby the logic latch is reset when the load command signal is removed from the load control line.

5. A circuit as claimed in claim 4, in which the logic gating comprises a first NAND-gate having one input connectible to a source of clock pulses and a second input connected to the load control line by way of an inverter, and a second NAND-gate having one input connected to the output of the first NAND-gate, and a second input connected to the output of the inverter, the output of the second NAND-gate being connected to the input of the logic latch.

6. A circuit as claimed in claim 5, in which the timing means comprises a binary counter arranged to count pulses from the source of clock pulses.

7. A circuit as claimed in claim 5, in which the first input of the first NAND-gate is connected to one input of an AND-gate which has a second input connected to the output of the voltage detector and a third input connected to the load control line, the output of the AND-gate being connected to the counter whereby clock pulses can be supplied to the counter when the AND-gate is open.

8. A circuit as claimed in claim 3, in which the output of the logic gate controlled by the logic latch controls the switch by way of a transistor having its emitter-collector path connected in series with the switch operating circuit and its base connected to the output of the logic gate.

9. A circuit as claimed in claim 2, in which the logic latch comprises a first NAND-gate having a first input connected to the output of the timing means, and a second NAND-gate having a first input connectible to a source of clock pulses the output of the first NAND-gate being connected to a second input of the second NAND-gate, and the output of the second NAND-gate being connected to a second input of the first NAND-gate, and also constituting the output of the logic latch.

10. A circuit as claimed in claim 1, including a resistor connected in series with the load by way of the switch, the end of the resistor remote from the switch being connectible to a voltage source, and the voltage detector being connected to the junction between the resistor and the switch.

11. A circuit as claimed in claim 1, in which the switch is an electromagnetic relay.

12. A circuit as claimed in claim 1, including a second voltage detector connected in parallel with the first mentioned voltage detector and providing an output signal when the detected voltage rises above a predetermined value to indicate an open circuit.

* * * * *